# 2,706,192

2,706,192

METHOD FOR INCREASING POLYMERIZATION RATE IN SALT-ANTIFREEZE EMULSION POLYMERIZATION SYSTEMS

Edward H. Hoag, Fullerton, Calif., assignor to Phillips Petroleum Company, a corporation of Delaware No Drawing. Application November 16, 1951, Serial No. 256,823

3 Claims. (Cl. 260—84.1)

This invention relates to an improved process for polymerizing unsaturated organic compounds while dispersed in an aqueous emulsion. In one embodiment this invention relates to the use of subfreezing polymerization temperatures and aqueous media which contain a large quantity of a salt dissolved therein.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which includes a combination of an oxidant, a reductant, and an oxidation catalyst. In this type of recipe the peroxide or hydroperoxide is the oxidant. The oxidation catalyst is generally selected from a group of materials comprising compounds of metals such as iron, magnanese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methylcyclohexyl hydroperoxide, or cumene hydroperoxide. In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, an emulsifying agent such as a soap, or other known emulsifying agents, and various other ingredients which improve the qualities of the resulting latex or of the final rubber product.

It is known that emulsion polymerization reactions can be carried out at temperatures below 0° C. without the necessity of employing aqueous solutions of organic materials such as methanol, glycerol, glycol, and the like, as dispersion media. It has been shown that lower temperatures ordinarily employed when using alcohol-water systems emulsion polymerization reactions can be carried out by the use of a high salt aqueous medium, or antifreeze system, in which the materials to be polymerized are dispersed with the addition of a suitable surface active agent. Such processes are applicable at low temperatures ordinarily employed when using alcohol-water systems.

Any electrolyte which functions satisfactorily as a freezing point depressant and does not markedly inhibit polymerization or produce deleterious effects on the product is applicable for the production of high-salt aqueous media. Since lower temperatures can be obtained with some salts than with others, the choice of the salt employed is frequently determined by the temperature at which polymerization is to take place. In other instances where a number of salts might be found applicable, the choice is governed by other factors, such as the polymerization recipe employed, the effects produced by a particular electrolyte, etc. Materials ordinarily used are alkali metal salts, alkaline earth metal salts, and ammonium salts, which are of sufficient solubility at low temperatures to give an aqueous medium of the freezing point desired. Chlorides, nitrates, and sulfates of these metals are most frequently preferred, particularly the chlorides of sodium, potassium, calcium, magnesium, and ammonium. Highly soluble salts of organic acids of low molecular weight can also be used, such as salts of formic, acetic, propionic and butyric acids, and especially the potassium salts.

The amount of salt employed in the preparation of a high-salt aqueous medium is variable and is determined by the salt chosen and by other factors, such as the operating temperature and the polymerization recipe. In general the concentration of salt should be such that the freezing point of the aqueous medium is lower than the temperature of the heat exchange medium used to remove the heat of reaction, so that freezing will not take place when the emulsion is in contact with colder heat-exchange equipment, which will usually be below the freezing point of water. Some salts tend to have some inhibiting effects with some recipes but not with others, and at very low temperatures some salts will not be sufficiently soluble to be present in high enough concentration. Based upon the weight of water, the amount of salt will usually be at least 10 per cent by weight and will not exceed 30 per cent, and usually it will not be greater than 25 weight per cent. In some instances, of course, the solubility of a salt will not permit a concentration as high as 25 per cent by weight based on the water and in other cases, regardless of solubility, the desired effects are produced with solutions of lower concentration.

When effecting emulsion polymerization reactions in the salt-antifreeze systems as indicated hereinabove, it has been the practice to dissolve the dry salt in the emulsifier solution and charge this mixture to the reactor followed by the monomeric material, modifier, oxidant and activator. This is the obvious method since only one vessel is required for the emulsion-salt mixture, and, on a commercial scale, the problem of economics is always an important consideration. The method in use prior to this invention has been to heat the emulsifier mixture for considerable time after the addition of the dry salt in order to form a clear solution.

I have now discovered that increased conversion rates are realized when effecting emulsion polymerization reactions in salt-antifreeze systems if the emulsifier and salt solutions are prepared separately. Preferably the solutions should also be charged separately to the reactor. However the advantages of this invention are also realized if two solutions are mixed before they are charged. The other ingredients are added in accordance with known procedures.

This discovery is particularly surprising since, as indicated, the two aqueous solutions can be mixed immediately. Quite unexpectedly, if the aqeuous salt solution is prepared and added to the emulsifier solution conversion rates are faster than when the emulsifier and salt are mixed together in an aqueous solution. While it is generally preferred to charge the emulsifier solution first and then add the salt solution to it, this procedure can be reversed, if desired, and the emulsifier solution added to the salt solution. The other ingredients then can be added in the conventional manner, e. g. the oxidant can be added to the mixed emulsifier and salt solutions, then the mercaptan, monomeric material, and activator can be charged. If preferred, the oxidant can be added after all the other ingredients have been charged.

Emulsifying agents which are applicable are those which will remain soluble and perform the function of surface active agents in the concentration of salt chosen, that is, in the high-salt aqueous medium employed. Both anionic and nonionic types of emulsifying agents are suitable and give satisfactory results in polymerization reactions of the type described. The anionic emulsifiers most generally employed are soluble salts of the short chain or low molecular weight organic acids, i. e., compounds containing six to ten carbon atoms per molecule, such as sodium and potassium salts of capric acid, caprylic acid, caproic acid, sodium hexyl sulfate, and the like. Examples of nonionic emulsifiers include alkylated aryl polyether alcohols, sorbitan monolaurate, sorbitan monopalmitate, sorbitan monooleate, lecithin, and other materials which behave in a similar manner. The amount of emulsifying agent will generally be between about one and about ten parts by weight per 100 parts of monomeric material.

The monomeric material polymerized to produce polymers by the process of this invention comprises unsaturated organic compounds which undergo an addition polymerization in aqueous emulsion to form linear polymers of high molecular weight, and which generally contain the characteristic structure $CH_2=C<$ and also, in most cases, have at least one of the disconnected valences attached to an electronegative group, that is, a group which increases the polar character of the molecule such as chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin, and preferably a conjugated diolefin having from four to six carbon atoms, or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight. However the ratio of butadiene to the styrene compound can be in the range of from 35:65 to 95:5 by weight.

It is generally preferred that the emulsion be of an "oil-in-water" type, with the ratio of aqueous medium to monomeric material between about 1:1 and about 2.75:1, in parts by weight. At low ratios the emulsions tend to have high viscosities and at high ratios the yield per unit volume of reactor per unit of time is low. However the ratio of aqueous medium to monomeric material can be as low as 0.15:1 or lower. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The temperature at which polymerizations are carried out in accordance with my invention are usually below about 5° C. In general, it is found that the lower the polymerization temperature the better the characteristics of the resulting synthetic rubber product, providing that the recipe is sufficiently active to produce a sufficient extent of conversion within a permissible reaction time. Since, as is well known for all chemical reactions, the rate of reaction is slower at lower temperatures, it will usually not be feasible to conduct reactions below about —40° C., and satisfactory operation is more usually obtained between about —20° C. and 0° C.

In effecting emulsion polymerization of a monomeric material in accordance with my invention, particularly when a batch-type or semi-batch-type operation is carried out, the reactor is preferably first charged with the aqueous medium, which contains the emulsifier-salt solution prepared in accordance with this invention and the oxidant, and the monomeric material is then admixed with agitation of the contents. At the same time a reaction modifier, such as a mercaptan, is also included, usually in solution in at least a part of the monomeric material. An activator solution is separately added to the reaction mixture, and reaction then proceeds. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

The mercaptans which can be employed as polymer modifiers in the practice of this process can be alkyl mercaptans of low molecular weight. The mercaptans used will generally contain three to sixteen carbon atoms per molecule. Mixtures or blends of mercaptans are also frequently considered desirable and in many cases are preferred to the pure compounds. The amount of mercaptan employed will vary, depending upon the particular mercaptan compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. Also, in general, mercaptans having low molecular weights are very effective as modifiers when employed in the recipes of this invention whereas in some other types of polymerization recipes they behave as serious inhibitors or retarders. In the case of tertiary mercaptans, such as tertiary $C_{12}$ mercaptan, blends of tertiary $C_{12}$, $C_{14}$, and $C_{16}$ mercaptans, and the like, modification is obtained with 0.05 to 0.3 part mercaptan per 100 parts monomers, but smaller or larger amounts may be employed in some instances. In fact, amounts as large as 2 parts per 100 parts of monomers may be used. Thus the amount of mercaptan is adjusted to suit the case at hand.

Advantages of this invention are illustrated by the following example. The reactants, and their proportions, and the other specific ingredients of the recipes are presented as being typical and should not be construed to limit the invention unduly. In these recipes the parts are parts by weight per 100 parts by weight of monomeric material, whether expressed directly or in units based upon molecular weight, as in millimols. The same units of weight should, of course, be used throughout, i. e. when the monomeric material is measured in pounds the other ingredients are also measured in pounds or in millipound mols.

*Example*

Polybutadiene and butadiene-styrene copolymers were prepared at —10° C. using two different charging procedures. In some instances the salt and emulsifier solutions were prepared separately and then charged while in the remaining runs (controls) the dry salt was dissolved in the emulsifier solution which was previously prepared. In each case the pH of the emulsifier solution was about 9.8. The recipes, charging procedures, and results are given below. Two reactors of similar construction were employed and are so designated. Runs were made in each reactor preparing polybutadiene and butadiene-styrene copolymers using both charging procedures.

|  | Polybutadiene | | | |
|---|---|---|---|---|
|  | Reactor 1 | | Reactor 2 | |
| Charging procedure* | A | B | A | B |
| Water | 200 | 200 | 200 | 200 |
| K caprylate | 10 | 10 | 10 | 10 |
| Tert-butylisopropyl-benzene hydroperoxide |  |  |  |  |
| Diisopropylbenzene hydroperoxide | 0.194 | 0.194 | 0.194 | 0.194 |
| Butadiene | 100 | 100 | 100 | 100 |
| Styrene |  |  |  |  |
| KCl | 0.4 | 0.4 | 0.4 | 0.4 |
| $Na_4P_2O_7$ | 0.272 | 0.272 | 0.272 | 0.272 |
| $FeSO_4 \cdot 7H_2O$ | 0.278 | 0.278 | 0.278 | 0.278 |
| NaCl | 34.7 | 34.7 | 34.7 | 34.7 |
| Tert-$C_6$ Mercaptan | 0.33 | 0.45 | 0.28 | 0.40 |
| Time, hours | 11.0 | 13.5 | 10.2 | 12.5 |
| Conversion, Percent | 60.0 | 57.2 | 59.2 | 58.4 |

|  | Butadiene-Styrene Copolymers | | | |
|---|---|---|---|---|
|  | Reactor 1 | | Reactor 2 | |
| Charging procedure* | A | B | A | B |
| Water | 200 | 200 | 200 | 200 |
| K caprylate | 10 | 10 | 10 | 10 |
| Tert-butylisopropyl-benzene hydroperoxide |  | 0.208 |  | 0.208 |
| Diisopropylbenzene hydroperoxide | 0.194 |  | 0.194 |  |
| Butadiene | 72 | 70 | 72 | 70 |
| Styrene | 28 | 30 | 28 | 30 |
| KCl | 0.4 | 0.4 | 0.4 | 0.4 |
| $Na_4P_2O_7$ | 0.272 | 0.272 | 0.272 | 0.272 |
| $FeSO_4 \cdot 7H_2O$ | 0.278 | 0.278 | 0.278 | 0.278 |
| NaCl | 34.7 | 34.7 | 34.7 | 34.7 |
| Tert-$C_6$ Mercaptan | 0.22 | 0.40 | 0.27 | 0.30 |
| Time, hours | 4.8 | 16.0 | 7.8 | 16.0 |
| Conversion, Percent | 62.5 | 61.3 | 60.0 | 64.2 |

*Charging Procedures:

A. (For butadiene.) The KOH is dissolved in about 40 per cent of the charge water, caprylic acid is added slowly, and the mixture is agitated for 10 to 15 minutes. The sodium chloride is dissolved in the remaining charge water which has previously been heated to 160 to 180° F. (71 to 82° C.). The reactor is purged with nitrogen and the emulsifier solution, NaCl solution, modifier in benzene (25 ml. benzene for a 5-gallon reactor charge), and ferrous pyrophosphate activator, previously prepared, are introduced in that order after which the temperature is adjusted to −10° C. The butadiene is added and finally the hydroperoxide followed by a benzene rinse (20 ml. for a 5-gallon reactor charge).

(For butadiene-styrene copolymer.) The emulsifier and NaCl solutions are prepared and charged separately as described above. Cooling is started and when the temperature reaches 30° F. (−1° C.) a solution of the mercaptan in styrene is charged (about 20 ml. of styrene is withheld for rinse). The remaining ingredients are added as described above followed by the styrene rinse.

B. Control (for polybutadiene). The KOH is dissolved in the charge water, caprylic acid is added slowly, and the mixture is agitated 10 to 15 minutes. Dry NaCl is added to the emulsifier solution and the mixture is heated until the salt is dissolved. The emulsifier-NaCl solution is charged to the reactor, which has previously been purged with nitrogen, and the remaining ingredients are added as described under procedure A for the preparation of polybutadiene.

Control (for butadiene-styrene copolymer). The emulsifier—NaCl solution is prepared and charged to the reactor as described above for the polybutadiene control. The remaining ingredients are charged as described under procedure A for the preparation of butadiene-styrene copolymers.

From the above tables the advantages of my novel charging procedure can be readily seen. It is surprising that my method of preparing and charging the emulsifier and salt solutions separately to the reactor should give increased conversion rates over those obtained when the dry salt is dissolved in the emulsifier solution as is normally done. In both procedures the remaining ingredients are charged in the same way.

An interesting and novel feature of the polymerization reaction employed within the practice of my invention is discernible from the physical characteristics and behavior of the resulting latices. When certain emulsifiers, such as caprylates and some alkyl sulfates, are employed, coagulation of the latices is effected by the addition of water alone. In fact, the polymer has a tendency to precipitate as it is formed. In other cases, such as when nonionic emulsifiers are employed, the latices can be coagulated by a conventional laboratory procedure, i. e., by addition of acid or alcohol. A property inherent in nonionic compounds can also be applied when coagulating latices prepared in the presence of nonionic emulsifiers. This property is the reversible solubility of these compounds in water. Thus latices emulsified with nonionic emulsifiers may be coagulated merely by heating to 160° F., preferably in the presence of steam. Obviously the method of coagulating a particular latex is chosen to suit the case at hand. Other modifications and variations of this invention will of course occur to those skilled in the art and such modifications are deemed to be within the scope of this invention.

I claim:

1. In the production of synthetic rubber by polymerization of monomeric material selected from the group consisting of butadiene and butadiene-styrene in aqueous emulsion at a temperature below 5° C., the steps which comprise providing an aqueous solution of sodium chloride, providing an aqueous emulsifier solution of sodium caprylate, charging said solutions to a polymerization reactor maintained at a temperature below 5° C., charging an iron pyrophosphate activator, an oxidizing agent selected from the group consisting of tertiary butylisopropylbenzene hydroperoxide and diisopropylbenzene hydroperoxide, and a tertiary $C_6$ mercaptan to said polymerization reactor, and recovering the resulting polymer from said reactor.

2. The process of claim 1 in which the aqueous solution of sodium chloride and aqueous emulsifier solution are mixed prior to the time at which they are charged to the polymerization reactor.

3. The process of claim 1 in which the aqueous solution of sodium chloride and aqueous emulsifier solution are charged separately to the polymerization reactor.

References Cited in the file of this patent

UNITED STATES PATENTS 2,615,009     St. John et al. _____ Oct. 21, 1952

OTHER REFERENCES

St. John et al.: Journal of Polymer Science, vol. VII, Issue 2/3, August 1951, pages 159–173.